Nov. 28, 1967     E. L. ALLEN     3,354,478

WIRE CUTTING AND CONNECTING TOOL

Filed Oct. 22, 1965     2 Sheets-Sheet 1

INVENTOR
EDWARD L. ALLEN

Nov. 28, 1967   E. L. ALLEN   3,354,478
WIRE CUTTING AND CONNECTING TOOL
Filed Oct. 22, 1965   2 Sheets-Sheet 2

INVENTOR
EDWARD L. ALLEN

United States Patent Office 3,354,478
Patented Nov. 28, 1967

3,354,478
WIRE CUTTING AND CONNECTING TOOL
Edward L. Allen, Athens, Pa., assignor to Ingersoll-Rand Company, New York, N.Y., a corporation of New Jersey
Filed Oct. 22, 1965, Ser. No. 501,939
4 Claims. (Cl. 7—5.5)

ABSTRACT OF THE DISCLOSURE

A wire cutting and connecting tool comprising a pair of relatively movable arm members carrying cooperating cutting and gripping jaws. One of the arm members is arranged to actuate an electrical switch when the gripping jaws firmly hold a member and a wire to be soldered thereto whereby electrical soldering current is then supplied to the gripping jaws. The tool is, however, constructed such that no electrical current is supplied to the cutting jaws when the latter cooperate to cut a wire.

The disclosure

This invention relates to hand-held tools and more specifically to the provision of a new and improved hand-held tool which is particularly adapted for performing the dual functions of cutting a wire and connecting the wire by soldering to a member such as a second wire or an electrical terminal.

The principal object of the present invention is to provide a new and improved hand-held tool for performing these dual functions which is of a strong durable construction not readily susceptible to malfunction and also highly efficient and dependable in operation.

Another object of the invention is to provide a new and improved hand-held tool of this type which is particularly constructed and arranged such that the electrical soldering current is transmitted to the working members of the tool only when a member and a wire to be soldered thereto are firmly gripped by the working members of the tool.

These objects and those other objects and advantages of the invention which will be apparent from the following description are obtained by the provision of a hand-held tool comprising a housing, a first arm member longitudinally carried by the housing, and a second arm member longitudinally carried by the housing adjacent the first arm member. The first and second arm members are relatively movable; and an actuating means is provided for effecting relative movement of the first and second arm members. The first and second arm members carry cutting jaw means which are cooperative upon relative movement of the first and second arm members to cut a wire disposed therebetween and, also, carry gripping jaw means which are cooperative upon relative movement of the first and second arm members to hold a member and a wire to be connected thereto by soldering. A current carrying means, operatively connected to a source of electrical current, is connected to the gripping jaw means to transmit electrical current thereto when the gripping jaw means hold a wire and a member to cause the gripping jaw means to solder the wire to the member.

Referring to the drawings wherein three embodiments of the invention have been given for the purposes of illustration:

Figure 1:
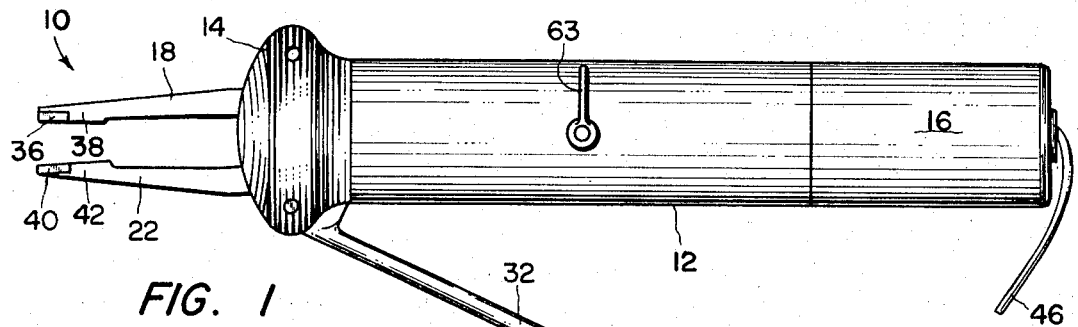
FIG. 1 is an elevational external view of a hand-held held tool constructed in accordance with one embodiment of the invention.

Referring more particularly to the drawings wherein similar reference characters designate corresponding parts throughout the several views, FIGS. 1 through 5 illustrate a hand-held tool designated generally at 10 which is constructed in accordance with the present invention. The hand-held tool 10 comprises an elongated housing or casing 12 having a forward end 14 and a rear end 16.

A first arm member 18 is longitudinally disposed within the housing 12 and has its forward end projecting from the forward end 14 of the housing 12. The first arm member 18 is pivotably connected intermediate its ends to the forward end 14 of the housing 12 by a pivot pin 20. A second arm member 22 is longitudinally disposed adjacent the first arm member 18 and pivotably connected at its rear end to the housing 12 by a pivot pin 24. The forward end of the second arm member 22 projects from the forward end 14 of the housing 12 adjacent the forward end of the first arm member 18.

The first arm member 18 and the second arm member 22 are normally maintained in spaced relationship by a spring 26 which is disposed between a spring seat 28 formed on the first arm member 18 and a spring seat 30 formed on the second arm member 22. The second arm member 22 is pivotable towards the first arm member 18 by a manually operable, actuating lever 32 which is pivotably mounted by a pivot pin 34 upon the forward end 14 of the housing 12 in abutting relationship with the second arm member 22.

The forward end of the first arm member 18 carries a cutting jaw 36 and a gripping jaw 38 immediately rearwardly of the cutting jaw 36. The forward end of the second arm member 22 carries a cutting jaw 40 in alignment with the cutting jaw 36 and a gripping jaw 42 in alignment with the gripping jaw 38. The cutting jaws 36 and 40 cooperate to cut a wire disposed therebetween upon pivotable movement of the second arm member 22 towards the first arm member 18. The gripping jaws 38 and 42 cooperate to hold a member such as a wire or an electrical terminal and a wire to be soldered thereto upon pivotable movement of the second arm member 22 towards the first arm member 18 and solder the held wire to the held member. The gripping jaw 38 and the spring 26 are disposed upon opposing sides of the pivot pin 20 such that the spring 26 prevents pivotal movement of the first arm member 18 during this soldering operation until the member and the wire to be soldered thereto have been firmly gripped by the gripping jaws 38 and 42.

Figures 3, 4, 5:
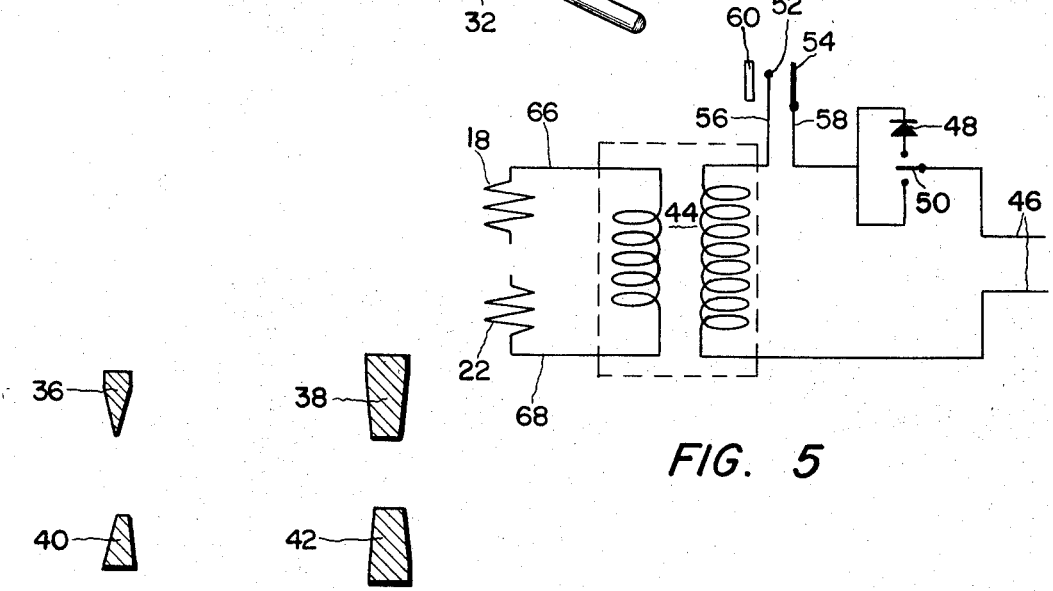
FIG. 3 is an enlarged sectional view of the cutting jaw means of the tool shown in FIGS. 1 and 2 taken on line 3—3 of FIG. 2, looking in the direction of the arrows.
FIG. 4 is an enlarged sectional view of the gripping jaw means of the tool shown in FIGS. 1 and 2 taken on line 4—4 of FIG. 2, looking in the direction of the arrows.
FIG. 5 is a schematic diagram of the electrical circuitry of the tool illustrated in FIGS. 1 through 4.

The high resistance electrical current requisite for the soldering operation is supplied by a transformer 44 which is carried by the rear end 16 of the housing 12. The transformer 44 is operatively connected to a suitable source of electrical current by the insulated electrical leads 46 and, as illustrated in FIG. 5, has a silicon rectifier or other suitable rectifying means 48 disposed in its primary circuit. The rectifier 48, in this illustrated embodiment of the invention, is adapted to provide half-wave rectification of the electrical current passing through the transformer 44 to permit the transformer 44 to be operated at one-half power. A manually operable electrical switch 50 is provided for switching the rectifier 48 out of the transformer primary circuit to permit full power operation of the transformer 44.

Figure 2:
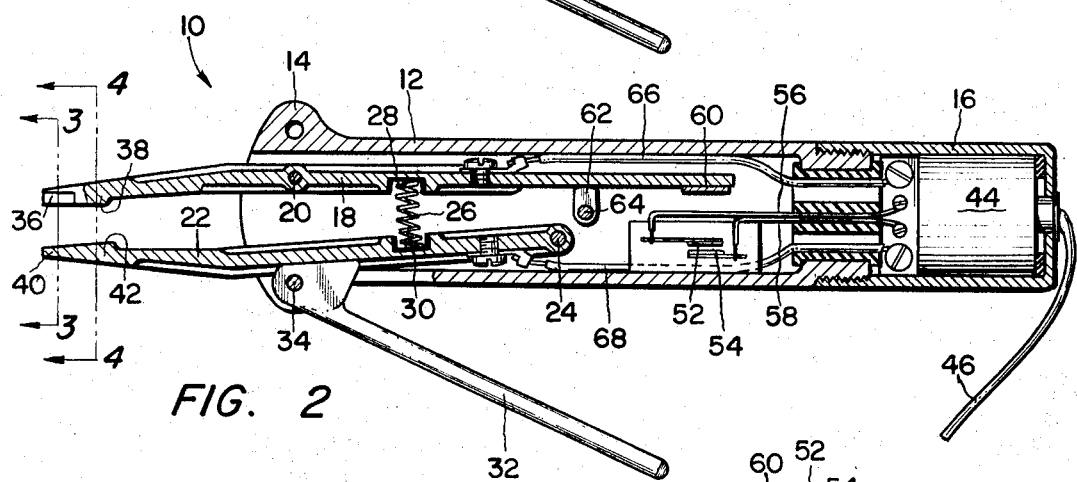
FIG. 2 is an elevational sectional view of the tool shown in FIG. 1.

A normally open electrical switch, such as the illustrated reed switch, having a stationary electrical contact 52 and a movable electrical contact 54 is disposed within the transformer primary circuit for controlling the passage of electrical current to the transformer 44. The reed switch is electrically connected to the transformer 44 by the insulated electrical leads 56 and 58 and, as illustrated in FIG. 2, is located adjacent the rear end of the first arm member 18. The rear end of the first arm member 18 carries a permanent magnet 60 adapted to draw the movable electrical contact 54 into electrical engagement with the stationary electrical contact 52 to close the reed switch. The strength of the permanent magnet 60 and the distance thereof from the movable electrical contact 54 prevent the reed switch from being closed by the permanent magnet 60 until the first arm member 18 is pivoted to locate the permanent magnet 60 in close proximity thereto. The spring 26 functions as a means for delaying this pivotal movement and the resultant closing of the reed switch until the member and wire have been firmly gripped by the gripping jaws 38 and 42. Thus, arcing between the gripping jaws 38 and 42 is prevented.

A locking member 62 is provided for preventing pivotal movement of the first arm member 18 when the hand-held tool 10 is operating as a cutting tool. The locking member 62 is pivotably mounted upon the housing 12 adjacent the rear end of the first arm member 18 by a pivot pin 64 and normally retains such end of the first arm member 18 from pivotal movement towards the movable electrical contact 54. The locking member 62 is pivotable by a manually operable control lever 63 disposed upon the housing 12 to permit movement of the first arm member 18 to locate the permanent magnet 60 in close proximity to the movable electrical contact 54.

The electrical current passing through the transformer 44, when the beforedescribed electrical switch is closed, is transmitted to the first and second arm members 18 and 22 by the insulated electrical leads 66 and 68, respectively, which electrically connect the arm members 18 and 22 to the transformer 44. The first and second arm members 18 and 22 are constructed from an electrically conductive material such that they, in turn, tranmit this electrical current to the gripping jaws 38 and 42 to complete the high resistance electrical soldering circuit. The first and second arm members 18 and 22 are, however, externally covered with a coating of an electrically insulating material to prevent this electrical current from passing into the housing 12 and the spring 26.

In the operation of the hand-held tool 10, the locking member 62 is normally positioned as illustrated in FIG. 2 to prevent pivotable movement of the first arm member 18 and resultant actuation of the movable electrical contact 54. With the first arm member 18 thus locked, the hand-held tool 10 may be operated as a cutting tool upon actuation of the actuating lever 32 to cut a wire disposed between the cutting jaws 36 and 40.

With the locking member 62 pivoted to permit pivotable movement of the first arm member 18, the hand-held tool 10 is operable as a soldering tool. As, however, the completion of the primary circuit of the transformer 44 is dependent upon the pivotal movement of the first arm member 18, electrical current is prevented from flowing to the gripping jaws 38 and 42 until the second arm member 22 has been sufficiently pivoted to cause the gripping jaws 38 and 42 to firmly grip a member such as a wire or an electrical terminal and the wire to be connected thereto. Thus, arcing between the gripping jaws 38 and 42 is prevented.

When a member and the wire to be soldered thereto have been firmly gripped by the gripping jaws 38 and 42, the first arm member 18 pivots to move the permanent magnet 60 into close proximity to the movable electrical contact 54. This relocation of the permanent magnet 60 moves the movable electrical contact 54 into electrical engagement with the stationary contact 52 to complete the primary circuit of the transformer 44 and cause electrical current to flow to the gripping jaws 38 and 42. Thus, a high resistance soldering circuit is formed through the gripping jaws 38 and 42 and the wire and member held thereby are soldered together. Similarly, the hand-held tool 10 may be then reused as either a cutting tool or a soldering tool as required by its application.

Figure 6:
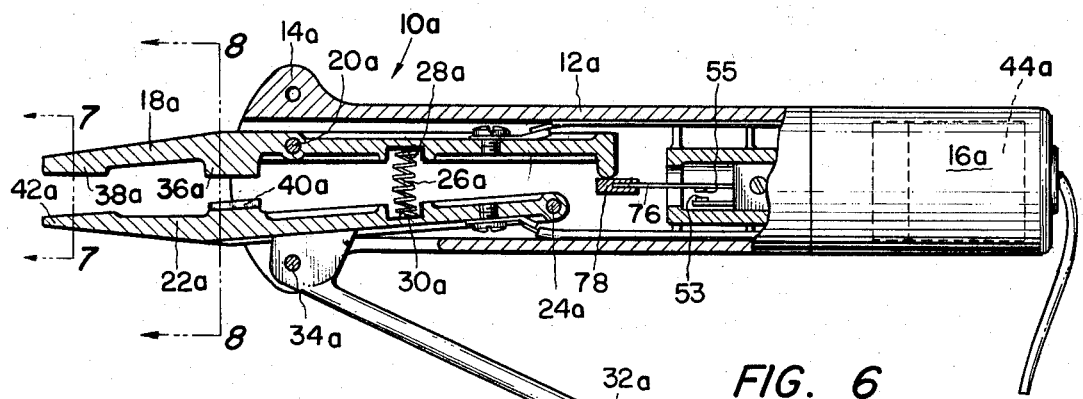
FIG. 6 is an elevational sectional view of a hand-held tool constructed in accordance with an alternative embodiment of the invention.
Figures 7, 8:
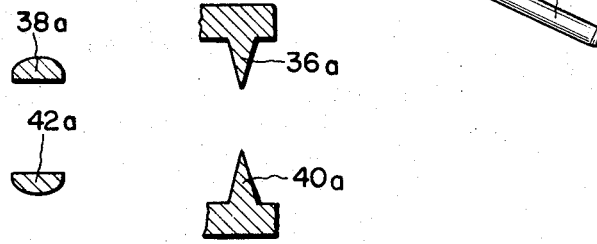
FIG. 7 is an enlarged sectional view of the gripping jaw means of the tool shown in FIG. 6 taken on line 7—7 of FIG. 6, looking in the direction of the arrows.
FIG. 8 is an enlarged sectional view of the cutting jaw means of the tool shown in FIG. 6 taken on line 8—8 of FIG. 6, looking in the direction of the arrows.

FIGS. 6 through 8 illustrate a hand-held tool designated generally at 10a which is constructed in accordance with an alternative embodiment of the present invention. The hand-held tool 10a is different from the hand-held tool 10 illustrated in FIGS. 1 through 5 in that the cutting and gripping jaws are disposed to ensure that electrical current does not pass through the hand-held tool 10a when the latter is employed as a cutting tool. The hand-held tool 10a further differs from the hand-held tool 10 in that the normally open electrical switch which is operable by the first arm member to complete the transformer primary circuit is actuated by the first arm member without the use of a permanent magnet. Other differences and distinctions between the hand-held tool 10a and the hand-held tool 10 will be apparent from the following description, wherein components of the hand-held tool 10a corresponding to like components of the hand-held tool 10 illustrated in FIGS. 1 through 5 have been designated by the reference character for their like part followed by the suffix a.

As illustrated in FIG. 6, the first arm member 18a carries a gripping jaw 38a at its forward end and a cutting jaw 36a immediately forward of the pivot pin 16a. The second arm member 22a carries a corresponding gripping jaw 42a and cutting jaw 40a in aligned relationship with the gripping and holding jaws 36a and 38a, respectively. This disposition of the cutting jaws 36a, 40a locates the cutting jaw 36a in closer proximity to the fulcrum of the first arm member 18a than the spring 26a to reduce the pressure required to operate the cutting jaws 36a, 40a below that necessary to compress the spring 26a. Thus, the hand-held tool 10a may be operated as a cutting tool without pivoting the first arm member 18a to cause the induction of electrical current into the arm members 18a and 22a even though no separate locking means be specifically provided for preventing this pivotal movement. The disposition of the gripping jaws 38a, 42a at the forward ends of the arm members 18a and 22a, however, locates such further from the pivot pin 16a than the spring 26a to ensure pivotal movement of the first arm member 18a when the hand-held tool 10a is employed as a soldering tool.

The electrical switch operable by the first arm member 18a to complete the primary circuit of the transformer 44a is generally similar to the reed switch illustrated in FIGS. 1 through 5. In this alternative embodiment of the invention, however, the movable electrical contact 55 of this switch is carried by a resilient lever arm 76 which carries an actuating block 78 in constant contact with the first arm member 18a. Thus, pivotal movement of the first arm member 18a moves the resilient lever arm 76 to urge the movable electrical contact 55 into engagement with the stationary electrical contact 53.

Figure 9:
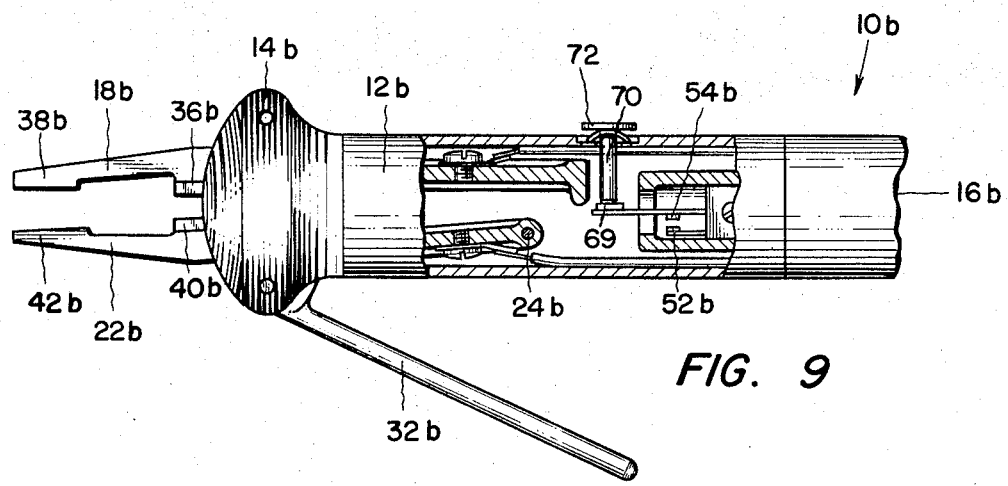
FIG. 9 is a fragmentary sectional view of a hand-held tool constructed in accordance with another alternative embodiment of the present invention.

FIG. 9 is a fragmentary sectional view of another alternative embodiment of the invention. In FIG. 9, the components of this embodiment corresponding to like components of the hand-held tool 10 illustrated in FIGS. 1 through 5 have been designated by the reference character for their like part followed by the suffix b. In this embodiment of the invention, the movable electrical contact 54b of the electrical switch for transmitting electrical current to the gripping jaws 38b and 42b is carried by a resilient lever arm 69 and is closed by a plunger 70 carried by a manually operable control button 72. In this manner, the transmission of the electrical current to the gripping jaws 38b and 42b is positively prevented until the gripping jaws firmly hold a member and a wire to be soldered thereto; and arcing between the gripping jaws 38 and 42 is prevented.

The operation of these alternative embodiments of the invention is believed to be apparent from the foregoing description.

From the foregoing, it will be seen that I have provided new and improved means for accomplishing all of the objects and advantages of my invention.

Having thus described my invention, I claim:

1. A wire cutting and connecting tool, comprising:
 a housing;
 a first arm member pivotably carried by said housing and extending longitudinally therefrom;
 a second arm member pivotably carried by said housing and extending longitudinally therefrom adjacent said first arm member;
 resilient means extending between said first and second arm members for urging said first and second arm members from one another;
 actuating means operatively connected to said second arm member for urging said second arm member towards said first arm member;
 cutting jaw means carried by said first and second arm members cooperating upon movement of said second arm member towards said first arm member to cut a wire disposed therebetween;
 gripping jaw means carried by said first and second arm members cooperating upon movement of said second arm member towards said first arm member to hold a wire and a member disposed therebetween;
 switch means operatively connected to a source of electrical current and actuatable in response to pivotable movement of said first arm member to transmit electrical soldering current to said gripping jaw means; and
 locking means operable for preventing pivotable movement of said first arm member when said cutting jaw means is cutting a wire.

2. A wire cutting and connecting tool, comprising:
 a housing;
 a first arm member pivotally connected intermediate its ends to said housing and extending longitudinally within said housing;
 a second arm member pivotally connected adjacent one of its ends to said housing and extending longitudinally within said housing adjacent said first arm member;
 resilient means intermediate said first and second arm members for urging said first and second arm members from one another;
 actuating means operatively connected to said second arm member for urging said second arm member towards said first arm member;
 cutting jaw means carried by said first and second arm members cooperating upon movement of said second arm member towards said first arm member to cut a wire disposed therebetween;
 gripping jaw means carried by said first and second arm members cooperating upon movement of said second arm member towards said first arm member to firmly hold a wire and a member disposed therebetween; and
 switch means operatively connected to a source of electrical current and actuable by said first arm member upon pivotable movement thereof to transmit electrical current to said gripping jaw means for soldering a wire and a member firmly held by said gripping jaw means;
 said resilient means and said gripping jaw means being relatively arranged such that said resilient means prevents pivotable movement of said first arm member until a wire and a member disposed between said gripping jaw means have been firmly held by the latter.

3. A wire cutting and connecting tool according to claim 2, wherein a locking means is provided for preventing pivotal movement of said first arm member when said cutting jaw means is cutting a wire.

4. A wire cutting and connecting tool, comprising:
 a housing;
 a first arm member pivotably carried by said housing and extending longitudinally therefrom;
 a second arm member pivotably carried by said housing and extending longitudinally therefrom adjacent said first arm member;
 resilient means extending between said first and second arm members for urging said first and second arm members from one another;
 actuating means operatively connected to said second arm member for urging said second arm member towards first arm member;
 cutting jaw means carried by said first and second arm members cooperating upon movement of said second arm member towards said first arm member to cut a wire disposed therebetween;
 gripping jaw means carried by said first and second arm members cooperating upon movement of said second arm member towards said first arm member to hold a wire and a member disposed therebetween;
 switch means operatively connected to a source of electric current and actuatable in response to pivotable movement of said first arm member to transmit electric soldering current to said gripping jaw means; and
 said resilient means and said gripping jaw means being relatively arranged such that said resilient means prevents pivotable movement of said first arm member until a wire and a member disposed between said gripping jaw means have been firmly held by the latter.

References Cited

UNITED STATES PATENTS

| | | | |
|---|---|---|---|
| 2,229,263 | 1/1941 | Van Keuren | 7—5.5 |
| 2,651,701 | 9/1953 | Backen | 219—90 |
| 3,152,239 | 10/1964 | Fauleoner | 219—90 |

OTHELL M. SIMPSON, *Primary Examiner.*

R. V. PARKER, *Assistant Examiner.*